United States Patent [19]

Kime

[11] 4,292,051

[45] Sep. 29, 1981

[54] APPARATUS AND METHOD FOR CENTRIFUGAL FLUID SEPARATOR

[76] Inventor: Wellesley R. Kime, 8745 Appian Way, Los Angeles, Calif. 90046

[21] Appl. No.: 123,229

[22] Filed: Feb. 21, 1980

Related U.S. Application Data

[63] Continuation-in-part of Ser. No. 25,276, Mar. 29, 1979, abandoned, Ser. No. 111,135, Jan. 10, 1980, abandoned, and Ser. No. 113,860, Jan. 21, 1980, abandoned.

[51] Int. Cl.³ .............................................. B01D 59/20
[52] U.S. Cl. ........................................ 55/17; 55/407; 55/415; 55/417; 55/DIG. 14; 233/DIG. 1; 210/371; 210/374
[58] Field of Search ................. 55/17, 400, 403, 406, 55/407, 414, 415, 417, DIG. 14; 210/371, 374, 378; 233/DIG. 1

[56] References Cited

U.S. PATENT DOCUMENTS

| | | | |
|---|---|---|---|
| 2,392,124 | 1/1946 | Denys | 55/406 |
| 2,422,882 | 6/1947 | Bramey | 55/17 |
| 2,536,423 | 1/1951 | Cohen et al. | 55/17 |
| 3,234,716 | 2/1966 | Sevin et al. | 55/407 |
| 3,273,325 | 9/1966 | Gerhold | 55/417 |
| 3,915,673 | 10/1975 | Tamai et al. | 55/17 |

FOREIGN PATENT DOCUMENTS

| | | | |
|---|---|---|---|
| 530646 | 7/1931 | Fed. Rep. of Germany | 55/17 |
| 733263 | 2/1943 | Fed. Rep. of Germany | 55/403 |
| 1109650 | 6/1961 | Fed. Rep. of Germany | 55/17 |
| 1282172 | 3/1962 | France | 233/DIG. 1 |
| 175840 | 3/1972 | United Kingdom | 55/17 |

Primary Examiner—David L. Lacey

[57] ABSTRACT

A method and apparatus for the ce ntrifugal separation of a fluid having heavier and lighter fractions into a first portion having an increased concentration of the heavier fraction and a second portion having an increased concentration of the lighter fraction and discharging the first portion peripherally and the second portion more centrally and retaining fluid between the first and second portions in the apparatus for the centrifugal separation.

22 Claims, 9 Drawing Figures

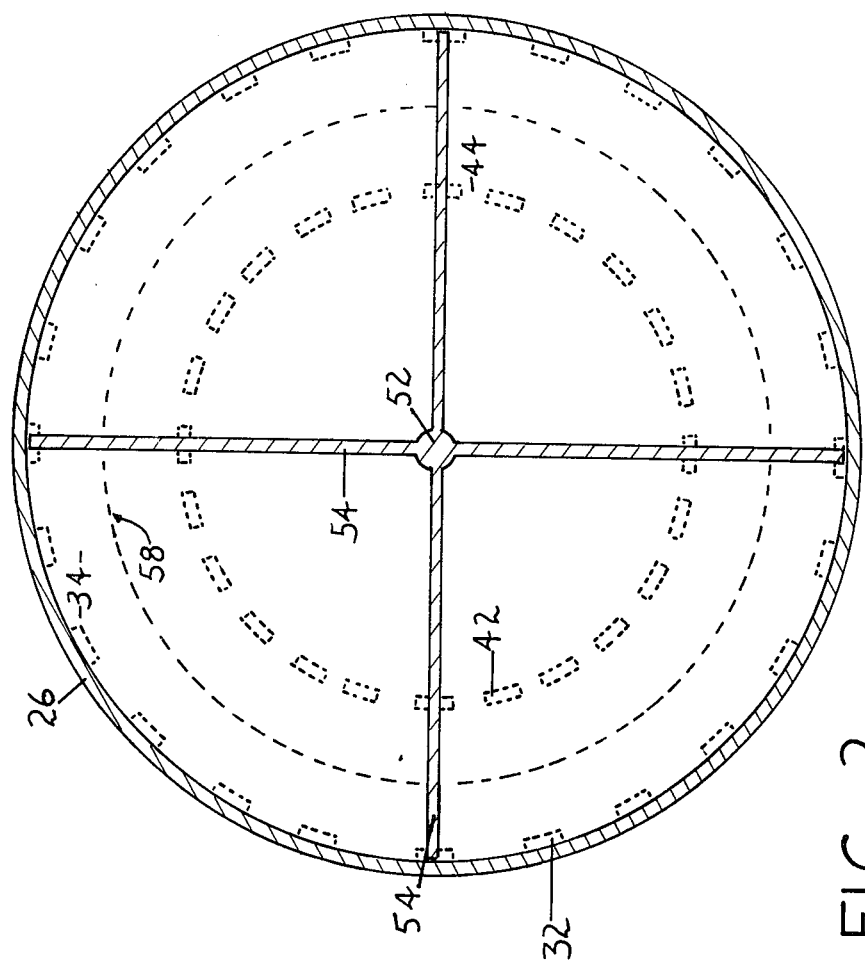
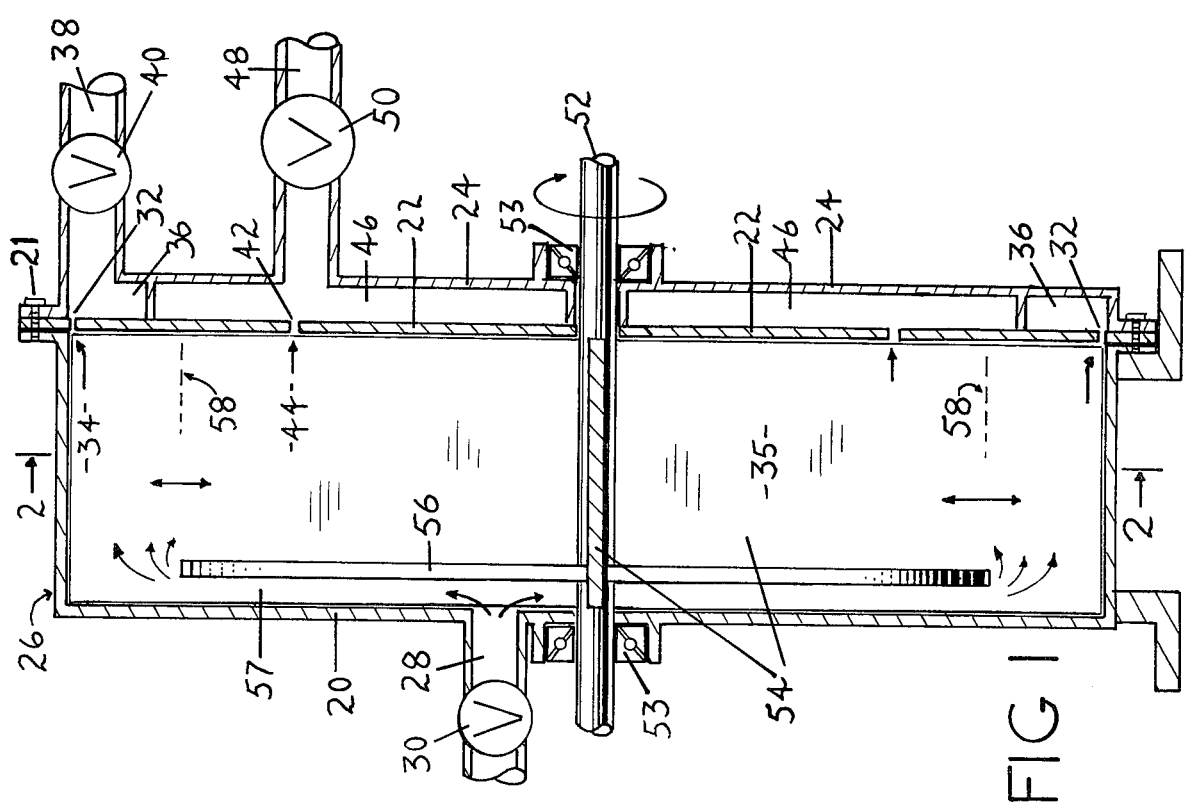

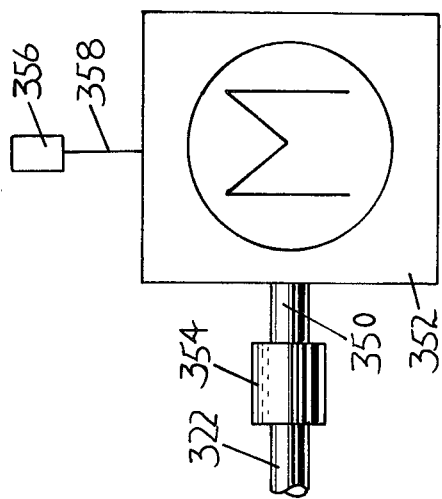
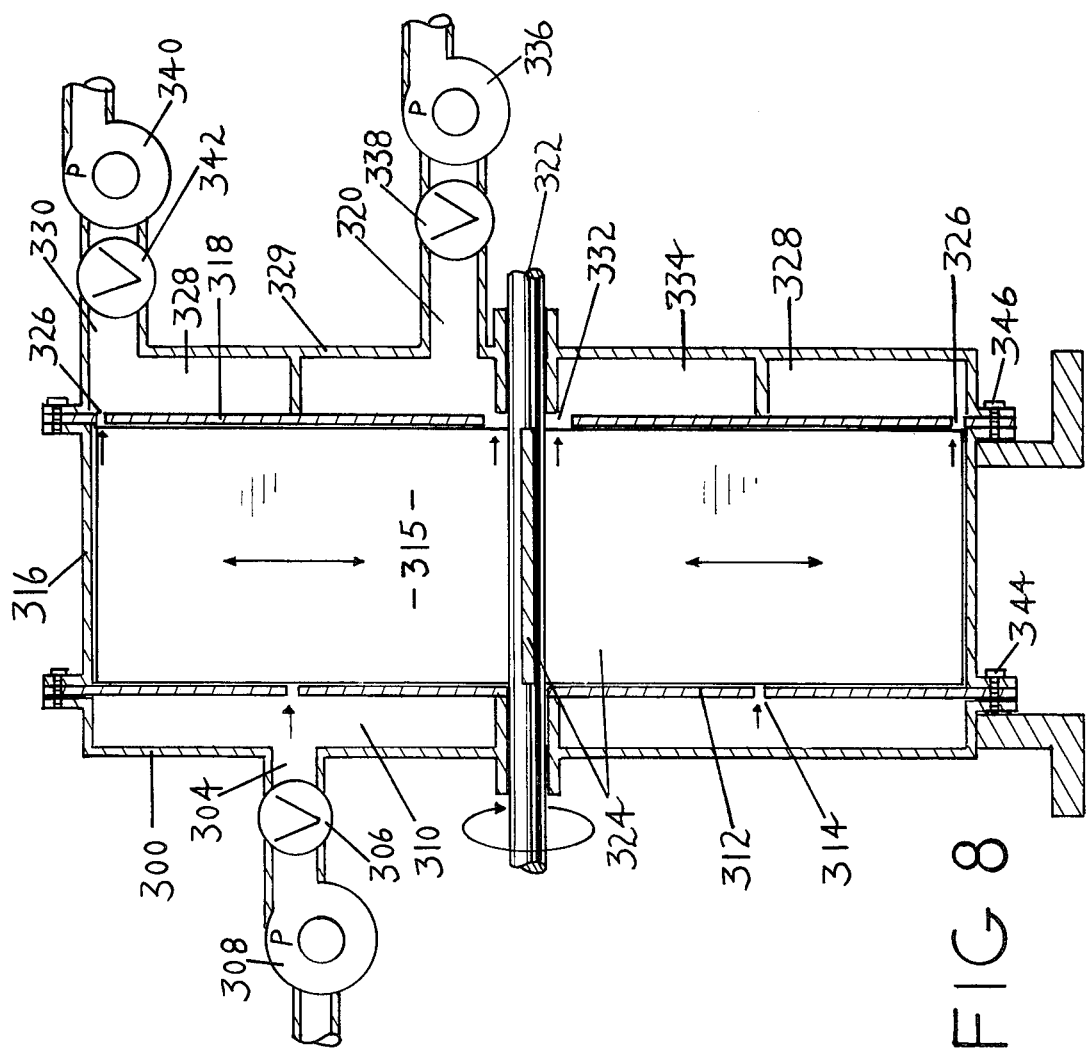

4,292,051

APPARATUS AND METHOD FOR CENTRIFUGAL FLUID SEPARATOR

CROSS-REFERENCE TO RELATED PATENT APPLICATIONS

This application is a continuation-in-part of the following applications:

Application Ser. No. 025,276, filed Mar. 29, 1979, for Centrifugal Molecular Fluid Separator, now abandoned.

Continuation-in-part application Ser. No. 111,135, filed Jan. 10, 1980, for Apparatus and Method for Centrifugal Fluid Separator, now abandoned.

Continuation-in-part application Ser. No. 113,860, filed Jan. 21, 1980, for Apparatus and Method for Centrifugal Fluid Separator II, now abandoned.

BACKGROUND OF THE INVENTION

In 1977, I observed a demonstration of a molecular air separator utilizing molecular sieves for the removal of nitrogen from air thus providing a source of oxygen.

Immediately thereafter I began working on inventing an apparatus for separating air into its primary constituents, oxygen and nitrogen, comprising less sophisticated equipment by utilizing centrifugal means. My original concept provided for a rotating drum or container for causing fluid to be rotated rapidly. I realized, however, that is would be difficult to construct a rotatable drum or container with such precision that it could be rotated with sufficiently high speed to accomplish the desired separation.

After prolonged deliberation, I conceived of a centrifugal separator without a rotating drum or container by utilizing a plurality of centrifugal baldes radiating outwardly from a rotatable shaft to close proximity to a stationary housing.

By eliminating a rotating housing, rotating drum or container, the apparatus is less expensive to manufacture and is able to attain higher fluid rotational speeds and greater separation. I filed the original U.S. Patent application on Mar. 29, 1979. A first continuation-in-part application was filed in the U.S. Patent Office on Jan. 10, 1980, and the second continuation-in-part application was filed on Jan. 21, 1980. The present application is a continuation-in-part of the aforesaid application.

DEFINITION OF TERMS

As used in this specification and the appended claims, the following terms have the meanings set forth below:

heavier fraction: Molecules in a fluid having a higher molecular weight than other molecules in the fluid; particles having a higher density than other particles in a fluid; particles having a higher density than a fluid; or fluid having a higher density than particles in the fluid.

lighter fraction: Molecules in a fluid having a lower molecular weight than other molecules in the fluid; particles having a lower density than other particles in the fluid; particles in a fluid having a lower density than the fluid; fluid having a lower density than particles in the fluid.

peripherally, peripheral: Away from the shaft; toward the circumference of the centrifugal chamber or toward the stationary housing.

periphery of the centrifugal chamber: That portion of the centrifugal chamber at or near the circumference of the centrifugal chamber or close to the stationary housing.

centrally: Toward the axis of the shaft.

SUMMARY OF THE INVENTION

The object of the invention is to provide a centrifugal separator which will rotate a fluid having heavier and lighter fractions in a centrifugal chamber with sufficient rapidity that the heavier fraction moves peripherally thereby displacing the lighter fraction peripherally for the centrifugal separation of the fluid for forming a first portion with an increased concentration of the heavier fraction peripherally and a second portion having an increased concentration of the lighter fraction centrally, and discharging the first portion peripherally via a first outlet and the second portion more centrally via a second outlet, and retaining fluid in the centrifugal chamber between the first and second portions of fluid for the centrifugal separation.

Another object is to avoid rotating a housing as for example, a drum or container so that the apparatus may be manufactured inexpensively, so that the apparatus may be easily balanced and so that higher rotational speeds may be attained for greater centrifugal separation.

A further object of the invention is to provide such an apparatus which will function as a centrifugal pump for drawing fluid into the inlet and for urging the separated fluid through the outlets.

A still further object of the invention is to provide such an apparatus with means for moving the fluid peripherally within the centrifugal chamber where it will be subjected to sufficiently high rotational speed to accomplish the intended separation before any of the fluid is discharged through the second outlet.

Yet another object of the invention is to provide means for controlling the concentration of the heavier fraction discharged through the first outlet and the concentration of the lighter fraction discharged through the second outlet. To accomplish this purpose, the speed of rotation of the fluid within the apparatus may be controlled; the volume flow of fluid entering the apparatus, and/or discharged through the first and/or second outlet may be controlled.

A still further object of the invention is to provide such an apparatus with a third outlet for controlling the concentration of the heavier fraction discharged through the first outlet and the concentration of the lighter fraction through the second outlet although the rotational speed of the shaft may fluctuate within limits. Typically, an adjustable resistance, variable flow valve is placed in the third outlet.

Yet another object is to provide a novel device of the type described which is easy to operate and simple as regards its construction.

Further objects, features and advantages of the invention will become readily apparent from the following description when taken in connection with the attached drawings, in which:

BRIEF DESCRIPTION OF THE DRAWINGS

FIG. 1 is a plan view of a Centrifugal Molecular Separator embodying the present invention.

FIG. 2 is a cross-section of FIG. 1 taken through lines 2—2.

FIG. 8 is a still further modification of the centrifugal molecular separator embodying the present invention.

FIG. 9 shows means for powering the invention.

DESCRIPTION OF THE PREFERRED EMBODIMENTS

Figure 4:
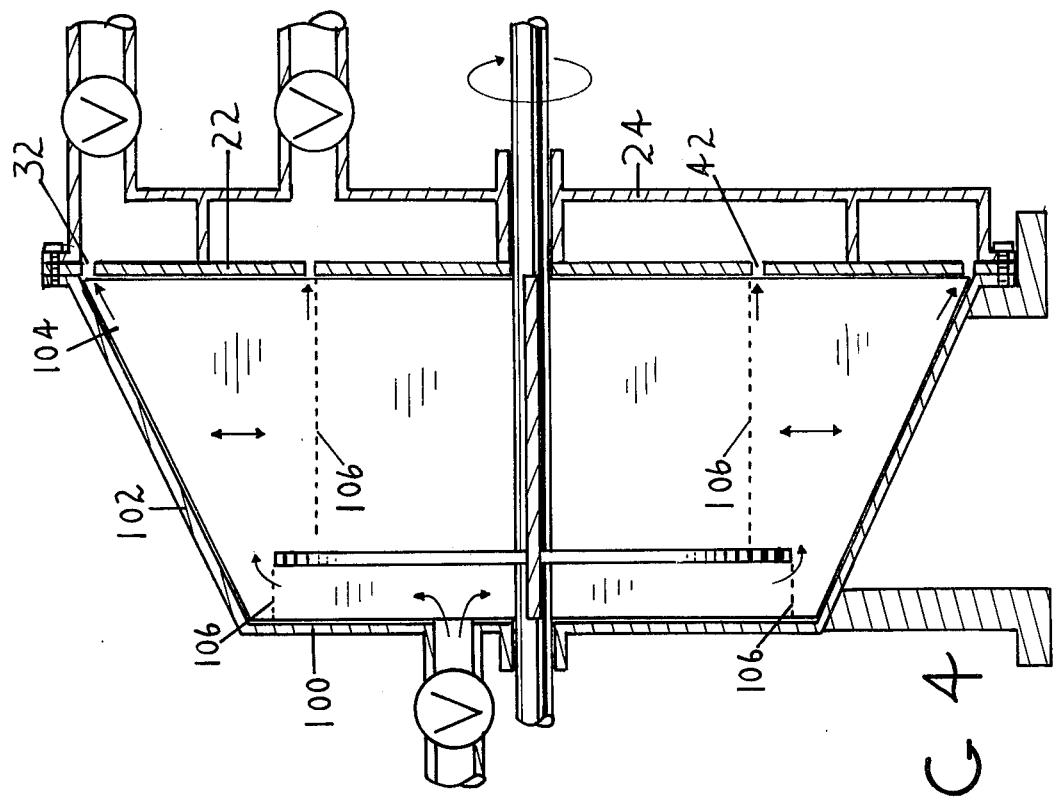
FIG. 4 is a plan view of another modification of the centrifugal molecular separator embodying the present invention.

Referring now to the drawings in which like reference numerals index like parts and with attention initially directed to FIGS. 1 and 2, there is shown a centrifugal fluid separator in accordance with the invention having a centrifugal housing comprising an intake end, which in this instance comprises intake-end-wall 20; a discharge end, which in this instance comprises a discharge-end-wall comprising of plate 22 and end-piece 24; and peripheral annular section 26. Intake-end-wall 20 is provided with fluid intake 28 having valve 30. Plate 22 is provided with a first concentric row of apertures 32 which communicate with peripheral portion 34 of centrifugal chamber 35 and with a first concentric channel 36 located between plate 22 and end-piece 24, the first concentric channel 36 communicates with first outlet 38 having valve 40. Plate 22 also has a more centrally located second row of concentric apertures 42 which communicate a more central area 44 of centrifugal chamber 35 with a second, more centrally located concentric channel 46, the latter opening into a second outlet 48 having valve 50. Shaft 52 turns freely on bearings 53, and is provided with a plurality of attached, outwardly radiating centrifugal blades 54 which extend to close proximity with the housing. The centrifugal chamber 35 is defined by intake-end-wall 20, peripheral annular wall 26, and the discharge end-wall.

In this instance, shaft 52 is additionally provided with optional transverse disc 56 which is in space relation with intake-end-wall 20 whereby sufficient space is maintained between intake-end-wall 20 and the transverse disc so that the flow of fluid from the intake end to the discharge end of the centrifugal chamber is not restricted. The transverse disc is of sufficient diameter, however, so that it will serve the purpose of causing the fluid which is moving through the centrifugal chamber to move peripherally to a location where it will be subjected to sufficient centrifugal force to accomplish the intended separation of the heavier fraction from the lighter fraction before any of the fluid is discharged from the apparatus.

By rapidly rotating shaft 52 with attached centrifugal blades 54, fluid within the centrifugal chamber is rapidly rotated for generating centrifugal force in the centrifugal chamber for:

(a) urging the heavier fraction peripherally thereby displacing the lighter fraction peripherally and moving the lighter fraction centrally within the centrifugal chamber for centrifugally separating the fluid into a first portion peripherally having an increased concentration of the heavier fraction and a second portion centrally having an increased concentration of the lighter fraction; and (b) discharging the first portion of fluid having an increased concentration of the heavier fraction via a peripheral outlet 38, and discharging the second portion of fluid having a higher concentration of the lighter fraction through a more central outlet 48, and for drawing fluid into the centrifugal chamber through an inlet 28 so that the apparatus functions as a centrifugal pump.

The apparatus functions as a centrifugal pump for urging fluid out of the centrifugal chamber via all of the outlets when the inlet is located centrally to all of the outlets, otherwise accessory pumping means may be used to move fluid through the apparatus, as for example means for urging fluid into the centrifugal chamber via the second outlet and/or first and second outlets; and/or means for urging fluid into the apparatus.

Some examples of fluids which may be separated into a first portion having an increased concentration of a heavier fraction and a second portion having an increased concentration of a lighter fraction include air, air containing methane, air containing dirt particles, water containing oil, water containing dirt, milk containing cream, oil containing dirt.

At this point I will discuss the separation of air into a first portion having a higher concentration of oxygen and a second portion having a higher concentration of nitrogen.

Air is drawn through inlet 28 into the centrifugal chamber and moves peripherally to the peripheral edge of transverse disc 56; oxygen is then urged peripherally by centrifugal force and nitrogen is displaced peripherally by oxygen as the air moves from the inlet end to the outlet end of the apparatus, for forming a first portion with a higher concentration of oxygen peripherally and a second portion with a higher concentration of nitrogen centrally. The first portion is discharged through apertures 32 defined by plate 22, through the first concentric channel 36 defined by plate 22 and end-piece 24 and out the first outlet 38. The second portion is discharged more centrally through the second row of concentric apertures 42 defined by plate 22, through the second concentric channel 46 defined by plate 22 and end-piece 24, and out the second outlet 48. The remainder of the air is retained in the centrifugal chamber for continued centrifugal separation.

The concentration of the heavier fraction being discharged through the first outlet and/or the concentration of the lighter fraction being discharged through the second outlet may be controlled by controlling the rate of flow of fluid passing through the centrifugal chamber, as for example by adjusting valve 30 in inlet 28, valve 40 in outlet 38, and valve 50 in outlet 48 although the ratio of the rate of fluid being discharged through the first and second outlets remains the same and/or adjusting the rotational speed of shaft 52. Typically, the degree of separation is increased as the speed of rotation of the shaft is increased and as the rate of flow of fluid passing through the centrifugal chamber is decreased. Also, the concentration of the heavier fraction in the first portion of fluid discharged via the first outlet is increased and the concentration of the lighter fraction in the second portion of fluid discharged via the second outlet is decreassed as the rate of the flow of fluid discharged via the first outlet is decreased and the rate of flow of fluid discharged through the second outlet is increased although the rate of discharge of fluid from the apparatus remains the same.

The discharging of fluid from the first and/or second outlets may be continuous or intermittent for obtaining the desired centrifugal separation.

Figure 3:
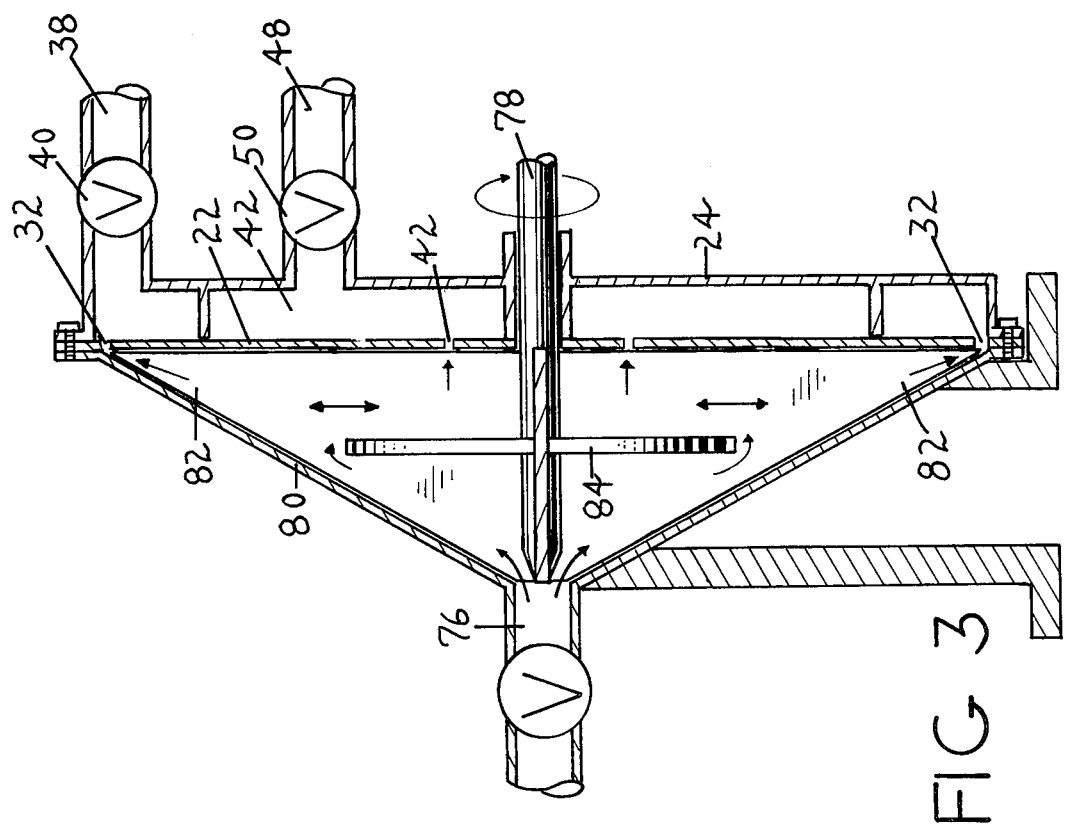
FIG. 3 is a plan view of a modification of the centrifugal molecular separator embodying the present invention.

Comparing the modified centrifugal separator shown in FIG. 3 with the centrifugal separator shown in FIG. 1, the inlet now indexed as numeral 76, is seen to be located at the level of the axis of the shaft, the shaft extending only through the discharge-end of the housing. The intake-end-wall, now indexed by the numeral 80, rather than being transverse-axial, diverges toward plate 22. Plate 22 together with end-piece 24 form the discharge-end-wall and the discharge-end of the housing. The peripheral portion of the centrifugal chamber, now indexed by numeral 82, diminishes in size peripherally. The optional transverse disc, now indexed by the numeral 84, moves fluid around its peripheral edge as stated re FIG. 1, before the second portion of the fluid can be discharged through the second row of concentric apertures 42 in plate 22. In this arrangement the portion of the housing surrounding the peripheral portion 82 of the centrifugal chamber funnels the first portion of fluid into the first row of concentric apertures 32 in plate 22. Otherwise, the function and structure of the modified apparatus in FIG. 3 is essentially as described with the apparatus in FIG. 1.

Comparing the modified centrifugal separator shown in FIG. 4 with the apparatus in FIG. 1, the peripheral annular wall, now indexed by the numeral 102, diverges toward the discharge end of the housing comprised of plate 22 and end-piece 24. The peripheral portion of the centrifugal chamber, now indexed by the numeral 104, diminishes in size peripherally and funnels the first portion of fluid in the periphery of the centrifugal chamber into the first row of concentric apertures 32, in plate 22. The remainder of the structure and function of the apparatus shown in FIG. 4 is essentially the same as that of the apparatus as shown and discussed re FIG. 1.

Figure 5:
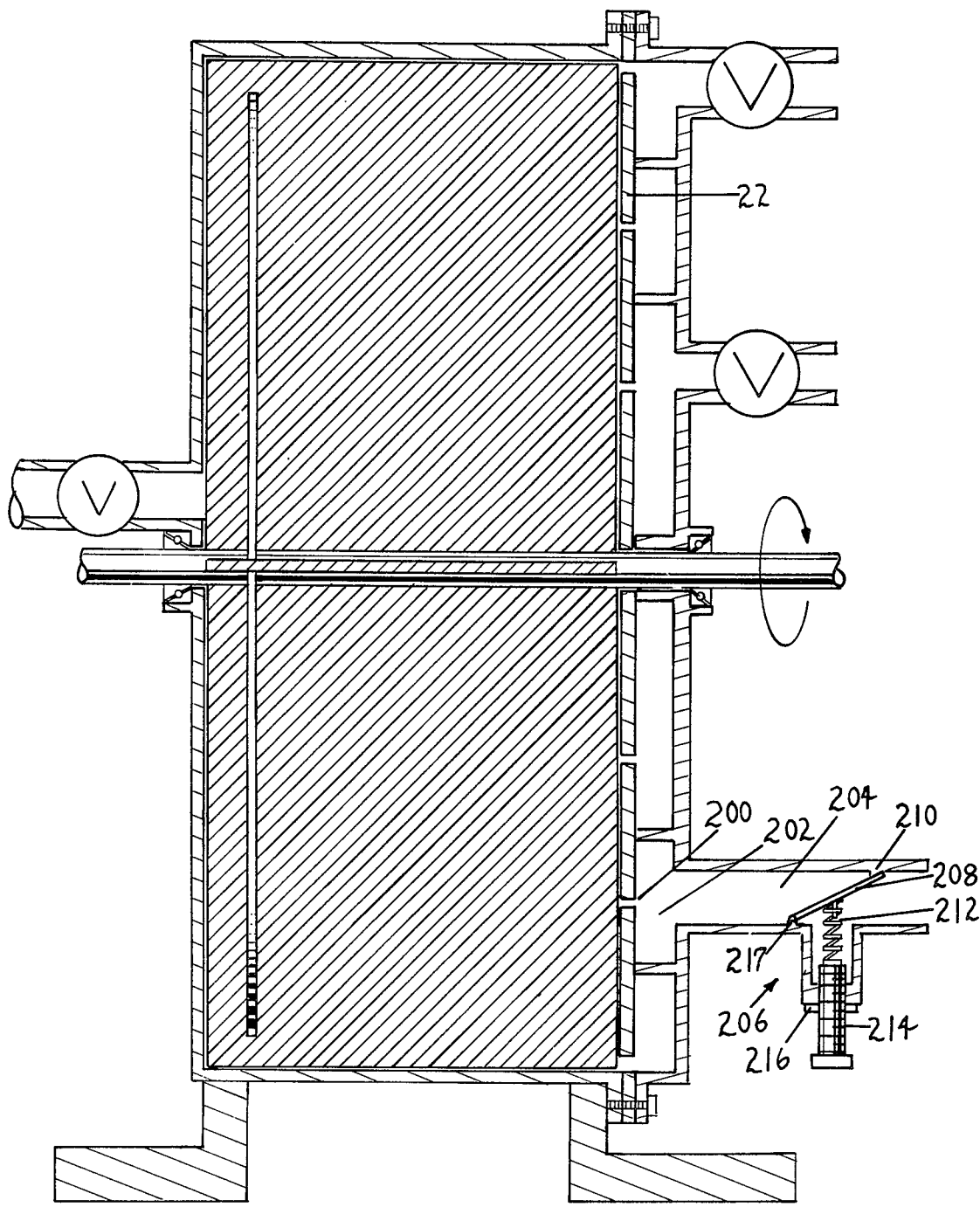
FIG. 5 is a plan view of still another centrifugal molecular separator embodying the present invention.

Comparing the modified centrifugal separator shown in FIG. 5 with the centrifugal separator shown in FIG. 1, the centrifugal blades are now cross-hatched to clearly show their peripheral edges to be in close proximity with the housing. Additionally, plate 22 is shown to have a third, intermediate row of concentric apertures 200, which communicate with a third, intermediate channel 202, the latter opening into a third, intermediate outlet 204, the latter having a valve indexed generally by the numeral 206. Valve 206 may be of any suitable type, however it is typically of the adjustable resistance, variable flow type as shown. The flow of fluid through the third outlet 204 is resisted by valve plate 208 which rests against valve seat 210 when the valve plate is in the closed position. Valve plate 208 is urged toward valve seat 210 by any suitable biasing means, as for example spring 212, the latter being compressed by adjustable turning bolt 214, the latter having a lock nut 216 for securing the turning bolt in position for maintaining the proper adjustment. Plate 208 is movably mounted on hinge 217 so that force exerted against plate 208 by the pressure of fluid in outlet 204, is greater than the force applied against plate 208 by spring 212; valve plate 208 moves away from valve seat 210 permitting fluid to pass through the valve and to be discharged from the apparatus.

The third outlet provides a means of discharging a mixture of heavier and lighter fractions of fluid from the centrifugal chamber between the first and second outlets for stabilizing the concentration of the heavier fraction in the first portion of fluid discharged through the first outlet and the concentration of the lighter fraction in the second portion of fluid discharged through the second outlet even though there may be some variation of the rotational speed of the shaft. In other aspects, the function and structure of the apparatus in FIG. 5 is essentially the same as the apparatus shown in FIG. 1.

Figure 6:
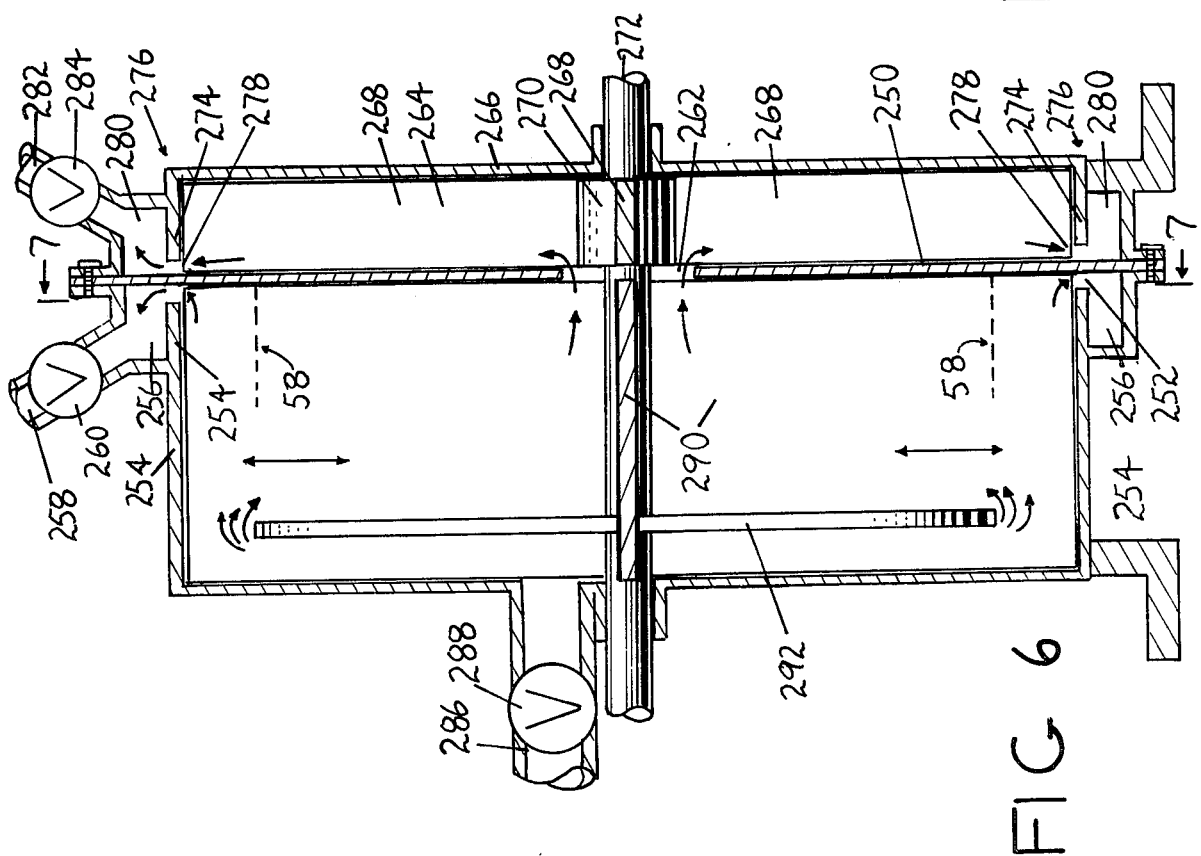
FIG. 6 is a plan view of a further modification of the centrifugal molecular separator embodying the present invention.

Comparing the modified centrifugal separator shown in FIG. 6 with the apparatus in FIG. 1, plate 22 is now indexed as plate 250, the concentric rows of apertures in the plate are now missing. The first concentric row of apertures 32, FIG. 1, have been replaced by the first aperture 252 defined by and located between plate 250 and the edge of the peripheral annular wall of the housing which is now indexed by the numeral 254, so that the first portion of fluid having the highest concentration of the heavier fraction is urged through aperture 252 into the first communicating channel 256 which is defined by peripheral annular wall 254 and plate 250, replacing the first concentric channel 36 in FIG. 1. The first communicating channel 256 communicates with the first outlet 258 which is provided with valve 260 for controlling the volume flow of fluid being discharged through outlet 258. The second concentric row of apertures in plate 22, FIG. 1, is now replaced by aperture 262 defined by and located in the central portion of plate 250. The second portion of fluid having the highest concentration of the lighter fraction is drawn through aperture 262 into the centrifugal discharge area 264 located between plate 250 and end-piece 266, the latter replacing end-piece 24 of FIG. 1. Fluid in the centrifugal discharge area 264 is urged peripherally by centrifugal force generated by a plurality of rotatable centrifugal blades 268 which are attached to hub 270, the latter being secured to the shaft, now indexed by numeral 272, by any suitable means, as for example by a set screw, not shown. Centrifugal discharge area 264 is defined by plate 250, end-piece 266, the annular peripheral portion 274 of end-piece 266, the latter being formed by an inward angulation, in this instance 90°, of end-piece 266 at 276. Fluid in the centrifugal discharge area passes through aperture 278 defined by and located between plate 250 and the edge of the annular peripheral portion 274 of the end-piece 266; the fluid then enters the second communicating channel 280 which replaces the second concentric communicating channel 46, FIG. 1. The second communicating channel 280, FIG. 6, is defined by the peripheral annular portion 274 of end-piece 266 and plate 250, and communicates with the second outlet 282 which is provided with valve 284. Outlet 282 and valve 284, FIG. 6, replace outlet 48 and valve 50 of FIG. 1. The inlet in FIG. 6 is now indexed by the numeral 286, and is provided with a valve which is now indexed by the numeral 288. The plurality of centrifugal blades radiating outwardly from shaft 272 in the centrifugal chamber are indexed by the numeral 290 and the optional transverse disc in the centrifugal chamber is indexed by the numeral 292. The structure and function of the apparatus in FIG. 6 is otherwise essentially the same as that of the apparatus in FIG. 1.

Figure 7:
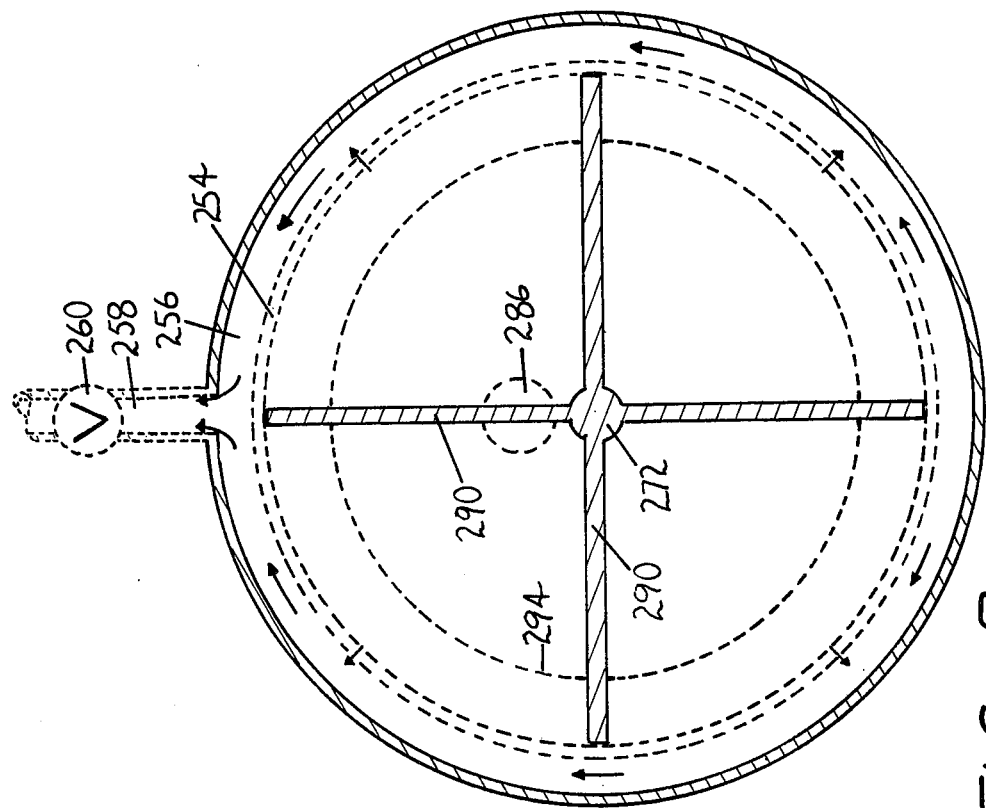
FIG. 7 is a cross section of the separator shown in FIG. 6 taken through lines 7—7. This figure is slightly reduced in size in comparison with FIG. 6.

The circular dashed line 294 in FIG. 7, represents the peripheral edge of transverse disc 292, FIG. 6. Outer edge 294, of transverse disc 292 may be any suitable distance from peripheral wall 254 of the housing. The function of the transverse disc is the same as described re FIG. 1.

In FIG. 6, the discharge-end of the housing, in addition to plate 250 and end-piece 266, includes the portion of the peripheral annular wall 254 which together with plate 250 defines aperture 252 and the first communicating channel 256.

FIG. 8 shows the apparatus with the inlet peripherally located with respect to the second outlet so that the apparatus does not function as a centrifugal pump for urging fluid through the second outlet; this form of the invention requires auxiliary means for urging fluid into the centrifugal separator and/or drawing fluid through the apparatus via the second outlet. The inlet-end-wall of the housing is comprised of inlet end-piece 300 having inlet 304 with valve 306 and any suitable pump, as for example centrifugal pump 308. Centrifugal pump 308 urges fluid through inlet 304, the volume flow of the fluid being controlled by valve 306, into the inlet annular communicating chamber 310 defined by inlet end-piece 300 and inlet end-plate 312, and flows through the annular row of apertures 314 defined by inlet end-plate 312 into the centrifugal chamber 315 defined by inlet end-plate 312, peripheral annular wall 316 and separation plate 318.

When shaft 322 with attached plurality of outwardly radiating essentially axially aligned centrifugal blades 324, is rapidly rotated, fluid in the centrifugal chamber is rapidly rotated for generating centrifugal force for urging the heavier fraction in the fluid peripherally thereby displacing the lighter fraction which is thereby moved centrally. The first portion of fluid having an increased concentration of the heavier fraction is urged by centrifugal force generated in the fluid in the centrifugal chamber through the first, peripheral row of concentric apertures 326 defined by the separation plate 318 into the first, peripheral concentric communicating chamber 328 defined by the separation plate 318 and discharge end-piece 329 and then through the first outlet 330. The second portion of fluid having the highest concentration of the lighter fraction is urged through the second, more centrally located aperture 332 defined by the separation plate 318 into the second concentric communicating channel 334 defined by the separation plate 318 and discharge end-piece 329, both of which form the discharge-end-wall and then through the second outlet 320. Centrifugal pump 336 in the second outlet draws fluid through the second outlet as an alternative for means for urging fluid through the inlet of centrifugal pump 308. The volume flow of fluid flowing through the second outlet is controlled by valve 338. Centrifugal pump 340, in the first outlet, could be used to draw fluid through the first outlet if the inlet apertures defined by inlet-plate 312 were located as peripherally as the first, peripheral row of apertures 326 in separation plate 318 as an alternative to means for urging fluid into the apparatus through the inlet. Valve 342 may be adjusted to control the volume flow of fluid being discharged through first outlet 330. The inlet end-piece 300, inlet end-plate 312, and peripheral annular section 316 of the housing are secured together by any suitable means as for example by screws 344; and the discharge end-piece 329, separation plate 318, and peripheral annular section 316 of the housing are secured together by any suitable means as for example by screws 346. Fluid within the centrifugal chamber which is not being discharged through the first row of concentric apertures 326 or the second aperture 332 defined by separation plate 318 is retained within the centrifugal chamber for further centrifugal separation.

Turning to FIG. 9, shaft 350 of variable speed motor 352 is secured by coupling 354 to shaft 322 which is an extension of shaft 322 of the apparatus in FIG. 8; or said motor may be coupled with any of the apparatuses shown in FIGS. 1, 3, 4, 5, or 6 by any suitable means for rotating the shaft with sufficient rotational speed. The speed of the motor is adjusted by control 356 which is electrically coupled with motor 352 by electrical coupling 358.

Ball bearings for the shaft have not been shown in FIGS. 3, 4, 6 and 8 for simplicity; any suitable type of bearings may be used.

Peripheral annular wall 26 FIG. 1, may be secured to plate 22 and end-piece 24 by any suitable means as for example screws 21; screws or any suitable means may be used for securing the sections of the other apparatuses shown in the figures.

Although additional modifications and extensions of this invention will become apparent to those skilled in the art, all such variations and deviations which basically rely on the teachings through which this invention has advanced the art are properly considered to be within the spirit and scope of the invention.

What is claimed:

1. An apparatus for centrifugally separating fluid having heavier and lighter fractions into a first portion having an increased concentration of the heavier fraction and a second portion having an increased concentration of the lighter fraction, comprising:
   A. a stationary housing having an inlet end and an outlet end, the stationary housing defining a centrifugal chamber, the inlet end of the stationary housing having fluid inlet means for passage of fluid having heavier and lighter fractions into the centrifugal chamber, the outlet end of the stationary housing having a first outlet means for discharging a first portion of the fluid having an increased concentration of the heavier fraction peripherally from the centrifugal chamber and a second outlet means for discharging a second portion of the fluid having an increased concentration of the lighter fraction more centrally from the centrifugal chamber; and
   B. a rotatable member having a shaft and plurality of attached, outwardly radiating centrifugal vanes for rapidly rotating the fluid in the centrifugal chamber for providing centrifugal force for urging the heavier fraction peripherally for tending to displace the lighter fraction peripherally and urging the lighter fraction centrally for centrifugally separating the fluid into the first portion peripherally and the second portion more centrally in the centrifugal chamber.

2. The apparatus as defined in claim 1, further comprising:
   means for causing the fluid to move to a desired peripheral location in the centrifugal chamber before any of the fluid is discharged through the second outlet means.

3. The apparatus as defined in claim 2, wherein the means for causing the fluid to move to a desired peripheral location in the centrifugal chamber before any of the fluid is discharged through the second outlet means, comprises:
   an essentially transverse disc secured to the shaft for causing the fluid to have to move around the disc in order to move through the centrifugal chamber.

4. The apparatus as defined in claim 1, wherein:

the fluid inlet means is more centrally located than the first and second fluid outlet means.

5. The apparatus as defined in claim 1, wherein the inlet means further comprises:
   valve means.

6. The apparatus as defined in claim 1, wherein the first outlet means further comprises:
   valve means.

7. The apparatus as defined in claim 1, wherein the second outlet means further comprises:
   valve means.

8. The apparatus as defined in claim 1, further comprising:
   means for controlling the rotational speed of the rotating member.

9. The apparatus as defined in claim 1, further comprising:
   third outlet means in the discharge end of the centrifugal chamber for discharging a portion of the fluid located between the first and second portions of fluid being discharged via the first and second outlet means respectively.

10. The apparatus as defined in claim 8, wherein the third outlet means further comprises:
    valve means.

11. The apparatus as defined in claim 10, wherein the valve means in the third outlet means comprises:
    an adjustable resistance, variable flow type valve.

12. A method for centrifugally separating a fluid having heavier and lighter fractions into a first portion having an increased concentration of the heavier fraction and a second portion having an increased concentration of the lighter fraction, comprising the steps of:
    A. admitting fluid having heavier and lighter fractions into a centrifugal chamber defined by a stationary housing having an intake end and an outlet end;
    B. rapidly rotating the fluid in the centrifugal chamber by a rotating member having a shaft and a plurality of outwardly radiating vanes extending to close proximity with the stationary housing for urging the heavier fraction peripherally for tending to displace the lighter fraction peripherally for forming a first portion of fluid having an increased concentration of the heavier fraction peripherally and forming a second portion of the fluid having an increased concentration of the lighter fraction centrally;
    C. discharging the first portion of fluid through a first outlet means peripherally located in the outlet end of the stationary housing;
    D. discharging the second portion of the fluid via a second outlet means more centrally located in the outlet end of the centrifugal housing;

13. The method for centrifugally separating a fluid having heavier and lighter fractions as defined in claim 12, further comprising the step of:
    utilizing centrifugal force generated within the centrifugal chamber for drawing fluid into the centrifugal chamber through the inlet means and discharging fluid from the centrifugal chamber through the first and second outlet means.

14. The method for centrifugally separating a fluid having heavier and lighter fractions as defined in claim 12, further comprising the step of:
    moving the fluid to a desired peripheral location in the centrifugal chamber before any of the fluid is discharged from the centrifugal chamber.

15. The method for centrifugally separating a fluid having heavier and lighter fractions as defined in claim 14, wherein the step of moving fluid to a desired peripheral location in the centrifugal chamber before any of the fluid is discharged from the centrifugal chamber comprises the step of:
    causing the fluid to move around an essentially transverse disc secured to the shaft before the fluid can be discharged from the centrifugal chamber via the second outlet means.

16. The method for centrifugally separating fluid having heavier and lighter fractions as defined in claim 12, further comprising the step of:
    controlling the rate of flow of fluid passing through the apparatus by adjusting valve means in the inlet.

17. The method for centrifugally separating fluid having heavier and lighter fractions as defined in claim 12, further comprising the step of:
    controlling the concentration of the heavier fraction discharged via the first outlet means by controlling the volume flow of fluid being discharged via the first outlet means.

18. The method for centrifugally separating fluid having heavier and lighter fractions as defined in claim 12, further comprising the step of:
    controlling the volume flow of fluid discharged via the second outlet means with valve means.

19. The method for centrifugally separating fluid having heavier and lighter fractions as defined in claim 12, further comprising the step of:
    discharging some of the fluid in the centrifugal chamber between the first and second portions of fluid being discharged via the first and second outlets, via a third outlet means for tending to stabilize the concentration of the heavier fraction discharged through the first outlet means and the concentration of the lighter fraction discharged through the second outlet means.

20. The method of centrifugally separating fluid having heavier and lighter fractions as defined in claim 19, wherein the step of discharging fluid via the third outlet means comprises the step of:
    controlling the volume flow of fluid discharged through the third outlet means with valve means.

21. The method of centrifugally separating fluid having heavier and lighter fractions as defined in claim 20, wherein the valve means comprises:
    an adjustable resistance, variable flow valve.

22. The method of centrifugally separating fluid having heavier and lighter fractions as defined in claim 12, further comprising the step of:
    controlling the concentration of the heavier fraction discharged via the first outlet means and the concentration of the lighter fraction discharged via the second outlet means by controlling the rate of rotational speed of the rotating member.

* * * * *